United States Patent [19]
Smith, Jr.

[11] Patent Number: 4,616,387
[45] Date of Patent: Oct. 14, 1986

[54] METHOD OF MANUFACTURING SPHERICAL AND CYLINDRICAL BEARINGS

[75] Inventor: Joseph E. Smith, Jr., Birmingham, Mich.

[73] Assignee: O & S Manufacturing Company, Whitmore Lake, Mich.

[21] Appl. No.: 659,531

[22] Filed: Oct. 9, 1984

Related U.S. Application Data

[60] Division of Ser. No. 356,368, Mar. 9, 1982, Pat. No. 4,493,512, which is a continuation-in-part of Ser. No. 286,470, Jul. 24, 1981, Pat. No. 4,386,869.

[51] Int. Cl.⁴ .............................................. B21D 53/10
[52] U.S. Cl. ................................. 29/149.5 B; 29/446; 29/511
[58] Field of Search ................... 29/149.5 A, 149.5 B, 29/149.5 C, 446, 511; 308/2 R; 384/206, 208; 403/39, 134, 136

[56] References Cited

U.S. PATENT DOCUMENTS

| | | | |
|---|---|---|---|
| 3,695,651 | 10/1972 | Stuck | 29/149.5 B X |
| 4,102,585 | 7/1978 | Herbenar | 29/149.5 B X |
| 4,286,363 | 9/1981 | Morin | 29/149.5 B |

FOREIGN PATENT DOCUMENTS 895068  4/1962  United Kingdom ................ 403/134

Primary Examiner—Charlie T. Moon
Attorney, Agent, or Firm—Hauke & Patalidis

[57] ABSTRACT

A bearing assembly having bearing surfaces pre-loaded towards each other, the bearing surfaces being originally made in slightly non-conforming geometry and dimensions over the majority of their surface areas in sliding engagement, the areas of the bearing surfaces in engagement being thus less than the total available areas. During use, and through progressive wear-in of the bearing surfaces in engagement, the bearing surface areas in engagement are progressively enlarged with progressive conformity in geometry and dimension, the conforming surface areas being constantly kept in engagement by the elements in the assembly adapted to provide bearing pre-load.

3 Claims, 8 Drawing Figures

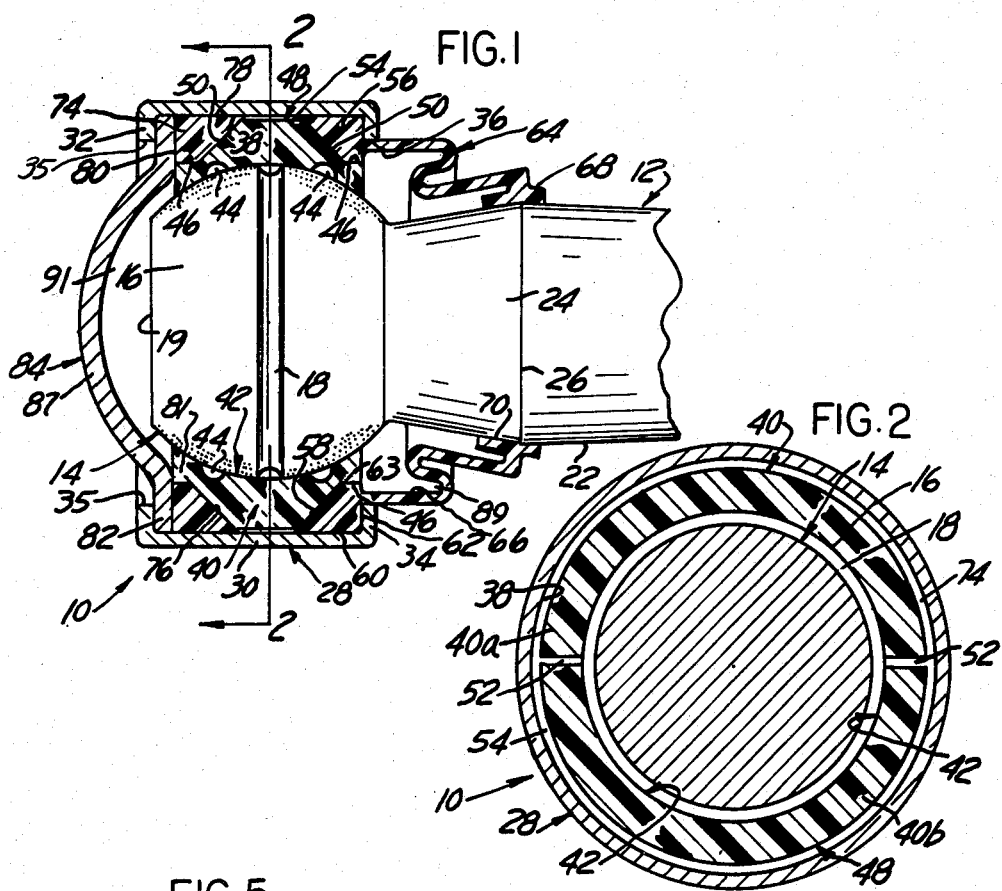
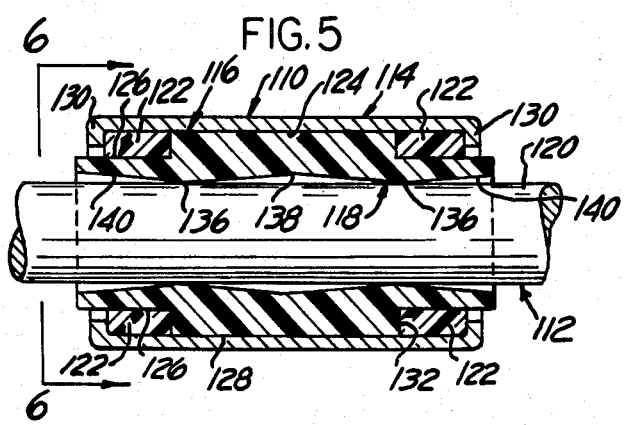
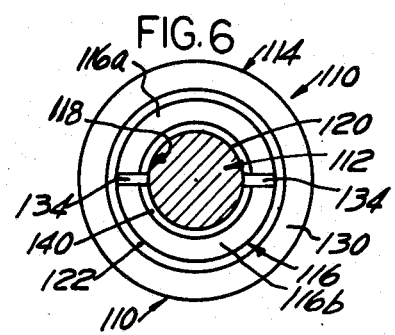
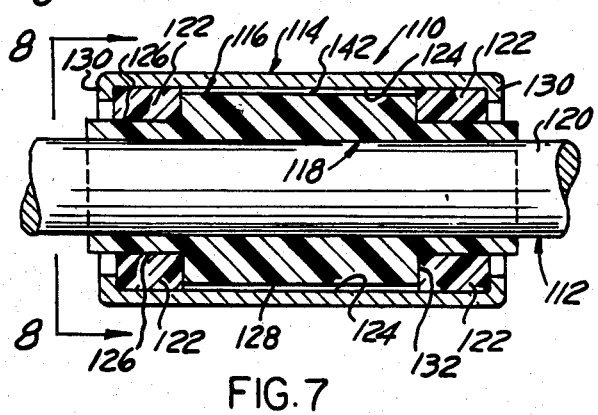
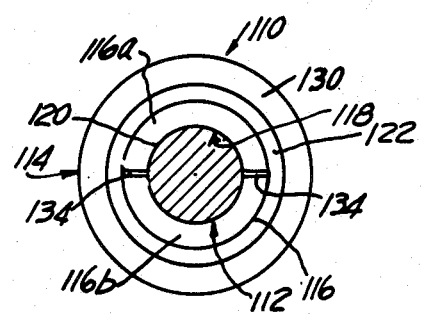

4,616,387

METHOD OF MANUFACTURING SPHERICAL AND CYLINDRICAL BEARINGS

CROSS REFERENCE TO RELATED APPLICATIONS

This application is a division of application Ser. No. 356,368, filed Mar. 9, 1982, for SPHERICAL AND CYLINDRICAL BEARINGS AND METHOD OF MANUFACTURING, now U.S. Pat. No. 4,493,512, issued Jan. 15, 1985 which is a continuation in part of application Ser. No. 286,470, filed July 24, 1981, for INTEGRALLY SEALED VIBRATION BALL AND SOCKET JOINTS, now U.S. Pat. No. 4,386,869, all assigned to the same assignee as the present application.

BACKGROUND OF THE INVENTION

The present invention relates to bearings in general, and more particularly to spherical and cylindrical bearings wherein the engaged bearing surfaces of an inner member and of an outer member are pre-loaded toward each other. The present invention contemplates that the bearing surfaces in engagement be provided with a particular geometry different at the time of manufacturing from the geometry which is finally obtained after a wear-in period.

The invention has particular applications to spherical bearings of the ball and socket type as are of general use in motor vehicle steering tie-rod assemblies, for example, and to both cylindrical and spherical bearings which are of general use in drag links, torque rods, suspension stabilizers, shock absorbers and friction snubbers, for example, in passenger cars, trucks, trailers, military vehicles, railroad vehicles, and the like.

It is customary to manufacture ball and socket bearings and cylindrical bearings for such use under exacting machining and assembly requirements, in order to provide heavy load bearing capability and long life under adverse conditions. For example, bearing surfaces in swivelling or rotary engagement are usually machined to the geometric shapes and to dimensions as accurate as technically feasible, with narrow tolerances and with exacting surface finishes. Such methods of manufacturing are not compatible with mass production at a reasonably low cost per unit, and the tolerances required may lead to bearing lock-up during assembly or after installation on a vehicle.

SUMMARY OF THE INVENTION

The present invention provides spherical and cylindrical bearings wherein the bearing surfaces in engagement are, by design, not strictly conforming with each other, but which, during usage, progressively wear into conforming bearing surfaces, the bearing pre-load and wear compensation means, forming part of the bearing assembly, taking up the play between the bearing surfaces that would normally occur during the wear-in period and during normal use subsequent to the wear-in period. The present invention accomplishes its objects by providing conformity of geometry and sizes, within usual manufacturing tolerances, only with respect to relatively small areas of the bearing surfaces in swivelling or rotational engagement, until the areas in bearing engagement have gradually worn to a specific target geometry resulting in full area of engagement between the bearing surfaces.

These and many other objects and advantages of the present invention will become apparent to those skilled in the art when the following description of the best modes contemplated for practicing the invention is read in conjunction with the accompanying drawing, wherein like reference numerals refer to like or equivalent parts, and in which:

BRIEF DESCRIPTION OF THE DRAWINGS

FIG. 1 is a partial longitudinal sectional view of an example of spherical bearing of the stud-ball and socket type according to the present invention;

FIG. 2 is a cross-sectional view thereof along line 2—2 of FIG. 1;

FIG. 5 is a partially longitudinal sectional view of an example of cylindrical bearing according to the present invention shown in the condition existing after assembly of the diverse elements;

FIG. 6 is a view from line 6—6 of FIG. 5;

FIG. 7 is a view similar to FIG. 5, but showing the relative position of the diverse elements after initial wear-in of the bearing surfaces; and FIG. 8 is a view from line 8—8 of FIG. 7.

DETAILED DESCRIPTION OF THE PREFERRED EMBODIMENTS

Figure 3:
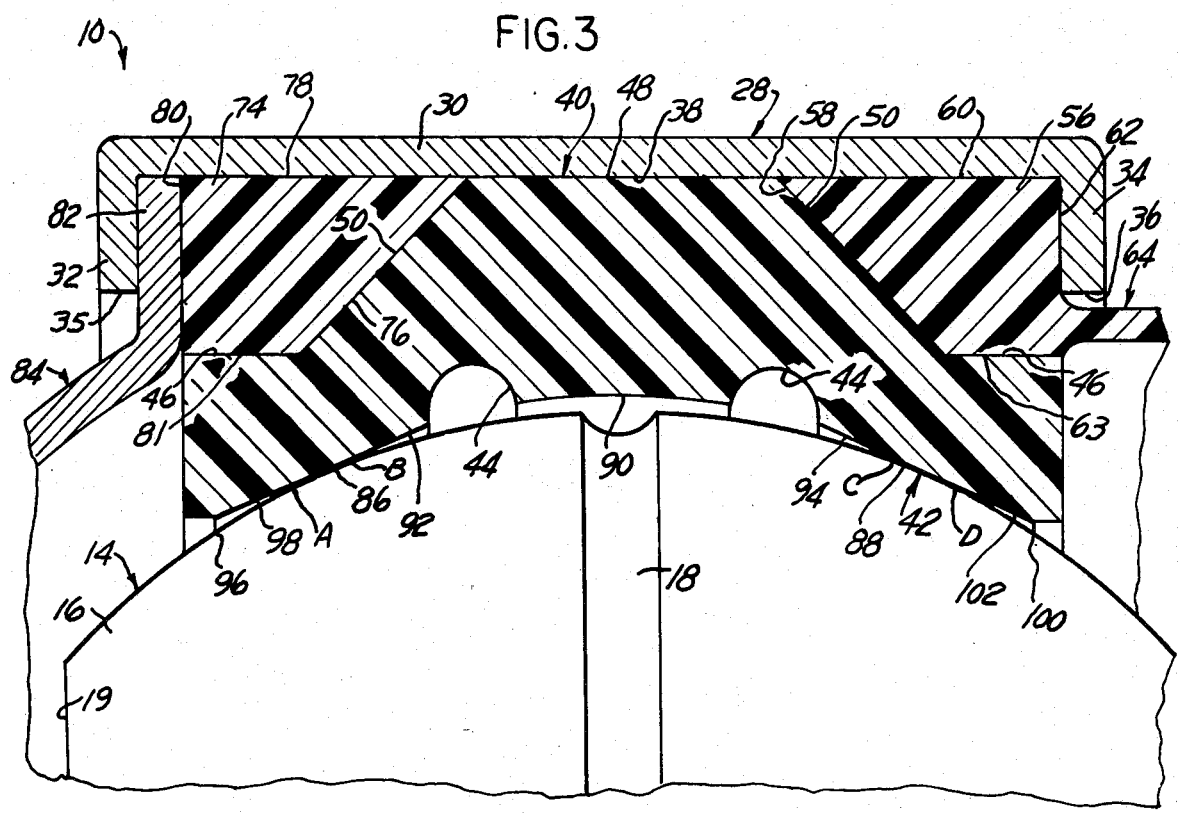
FIG. 3 is a partial view similar to FIG. 1, but at a much enlarged scale for showing the non-conforming geometry of the bearing surfaces in engagement after assembly of the joint.

Referring to the drawing, and more particularly to FIGS. 1-3 thereof, an example of structure for a knuckle or swivel joint 10 according to the present invention is, for example, of the type as disclosed in details in co-pending application Ser. No. 286,470, now U.S. Pat. No. 4,386,869. The knuckle or swivel joint 10 comprises a stud 12 provided at one end with an integral cold-headed ball 14 having a peripheral convex spherical surface 16, provided with an equatorial annular lubrication groove 18 and a flat end face 19. The stud 12 has a cylindrical end portion, not shown, provided with a peripheral thread and a tapered portion 22 for engagement in the correspondingly tapered bore of a first joint member, not shown, such as a steering arm or rod, a stabilizer arm of the like, a nut, not shown, threading over the threaded end of the stud 12 for fastening the stud 12 to the first jointed member, as is well known in the art. In the example of structure illustrated, the tapered portion 22 of the stud 12 is integrally connected to the ball 14 by a portion having a reverse taper, as shown at 24, along a circular line 26.

The spherical member or ball 14 is disposed in a cylindrical housing or shell 28 normally clamped or otherwise fastened to a second joined member, not shown. The shell 28 has a tubular body portion 30, made of steel or similar material, provided with a transverse radial flange 32 at one end and another transverse radial flange 34 at the other end, the transverse flanges 32 and 34 each forming an opening, 35 and 36, respectively. The shell 28 has an internal bore 38 adapted to freely receive a bearing ring 40. The bearing ring 40, made of steel, bronze, or, as illustrated, high strength plastic, has a generally spherical convex inner surface 42 in swivelling engagement with the spherical surface 16 of the ball 14, provided with a pair of parallel annular grooves 44.

The bearing ring 40 has large diameter symmetrically disposed peripherally cylindrical ends 46 and a cylindrical peripheral surface 48, a pair of frusto-conical or inclined surfaces 50 joining the cylindrical peripheral surface 48 to the cylindrical ends 46 of the ring. The bearing ring 40 is preferably made of two separate sections 40a and 40b, FIG. 2, such that, when placed over the ball 14, the two half rings 40a and 40b are separated by an average clearance gap 52. The bearing ring may also be made of three, four or more portions. With the bearing ring 40 disposed around the ball 14, the overall outer diameter of the cylindrical peripheral surface 48 of the bearing ring 40 is slightly less than the diameter of the inner bore 38 of the shell 28, with the result that an annular clearance, shown somewhat exaggerated at 54, exists all around the bearing ring 40 between its peripheral surface 48 and the surface of the internal bore 38 of the shell 28. The clearance 54 is normally very narrow and practically non-existent after the elements constituting the knuckle and swivel joint 10 are assembled.

A combination compression and seal ring 56 is disposed within the bore 38 of the shell 28 on one side of the bearing ring 40. The combination compression and seal ring 56 has a tapered end face 58 conforming to the shape of the tapered or inclined peripheral surface 50 of the bearing ring 40, and a peripheral cylindrical surface 60 disposed within the bore 38 of the shell 28. The combination compression and seal ring 56 has a radial annular surface 62 disposed in engagement with the inner surface of the shell and flange 34, and a cylindrical inner annular surface 63 engaged with the peripheral cylindrical end surface 46 of the bearing ring 40. A bellows seal or boot 64 is, preferably, integrally molded with the compression and seal ring 56. The bellows seal or boot 64 has a relatively thin wall flexible tubular body portion 66 terminating in an elastic annular integral garter flange 68. The combination compression and seal ring 56 is made of any appropriate elastomeric material such as natural rubber, synthetic rubber, polyurethane, or the like, and the garter flange 68 at the end of the bellows seal body portion 66 forms the edge of an opening 70 of a much smaller diameter than the largest diameter portion of the stud 12 at the junction line 26 between its tapered surface portion 22 thereof and its reverse taper portion 24. Preferably, the surface of the garter flange 68 has a slightly V-shaped surface 70, as seen from a section through the edge, such as to elastically conform with the shape of the stud periphery at the junction of the two tapered surfaces 22 and 24 along the junction line 26 and to remain firmly in position, as shown in FIG. 1.

The tapered end face 58 of the combination compression and seal ring 56 may be provided with a plurality of longitudinal grooves, not shown, which enable the compression ring portion 63 to be subjected to considerable compression stress and to absorb shocks and vibration.

A compression ring 74 is disposed on the other side of the bearing ring 40, symmetrically to the combination compression and seal ring 56. The compression ring 74, made of the same material as the combination compression and seal ring 56 and also preferably provided with longitudinal stress relieving grooves, has a tapered end face 76 engaged with the other tapered or inclined peripheral surface 50 of the bearing ring 40, a peripheral cylindrical surface 78, an end annular face 80, and an inner cylindrical surface 81. The compression ring 74 is disposed compressed within the bore 38 of the shell 28, its end annular face 80 engaging the surface of the transverse flange 82 formed at the edge of a retainer and closure cap 84 which is in the form of a dome-shaped body 87.

The diverse parts forming the ball and socket joint 10 are assembled from one end of the shell 28, prior to forming one of the end radial flanges 32 or 34, with the space 89 between the ball 14 and the interior of the pleated body portion 66 of the bellows seal 64 packed with an appropriate high temperature water-resistant lubricant such as grease, the space 91 between the dome-shaped body portion 87 of the retainer closure cap 84 and the flat end face 19 of the ball 18 being also filled with an appropriate lubricant such as grease. After the diverse parts are placed in the shell 28, one of the end flanges 32 or 34 of the shell 28 is bent over by swaging the corresponding rim of the shell 28, such as to form the annular retaining end flange. The annular retaining end flange, 32 or 34, is formed such as to exert a certain amount of pressure directed parallel to the longitudinal axis of the assembly which applies firmly the flange 82 of the retainer closure cap 84 against the annular surface 80 of the compression ring 74, and such as to exert considerable pressure on the corresponding tapered surface 50 and cylindrical surface 46 of the bearing ring 40 via the tapered surface 76 and the inner cylindrical surface 81 of the compression ring 74, now placed under compression. Simultaneously, the combination compression and seal ring 56 is compressed between the inclined end face 50 of the bearing ring 40 in engagement with the tapered surface 58 of the compression and seal ring 56 and the end flange 34 of the shell 28. The forces exerted by the compression ring 74 and the combination compression and seal ring 56 are applied to the opposite inclined surfaces 50 and to the surface of the cylindrical ends 63 of the split bearing ring 40, with the result that a considerable radial force is exerted on the split bearing ring 40 which causes the bearing surface 42 of the bearing ring to firmly engage the peripheral spherical surface 16 of the ball 14 at their areas in mutual contact.

Conventional bearing manufacturing methods require that the spherical surface 16 of the ball 14 be machined and ground to a substantially exact dimension and to a substantially precise spherical shape, and that the convex spherical surface 42 of the bearing ring 40 be machined and ground to substantially the same dimension as the spherical surface 16 of the ball 14, and be as spherical as possible such as to provide large areas of engaging surfaces in conforming dimensions and shape. Large bearing areas are required to permit effective transmission of loads between bearing surfaces without substantial permanent deformations of the surfaces, without sizing, and without embrittlement of the surface layers. The present invention, by contrast, contemplates that only small areas of the ball surface 16 and of the bearing ring surface 42 be at first in engagement with each other when the bearing unit is manufactured, and that the areas of the bearing surfaces in engagement progressively increase during wear-in of the unit, such wear-in being effected either after installation of the unit on a vehicle, or as a result of operating the ball and socket joint for an appropriate period of time under artificial load in a wear-in fixture providing motion of the ball 16 in all directions relative to the bearing ring 40. The invention provides that the ball 14 be ground with an appropriate spherical surface 16, and that the convex spherical surface 42 of the bearing ring 40 be finished, for example by grinding, according to different spherical surfaces of slightly different radii.

For example, as illustrated in detail, and in an exaggerated manner, at FIG. 3, the bearing ring surface 42 is generated according to a spherical surface substantially conforming to the spherical surface 16 of the ball 14 over narrow widths defined between the envelope of points A and the envelope of of points B between one of the lubrication grooves 44 and the edge of the bearing ring, and between the envelope of points C and the envelope of points D between the other lubricating groove 44 and the other edge of the bearing ring 40. Each of the spherical sectors defined between the points A and the points B envelopes and between the points C and the points D envelopes may be machined in a range as narrow or as wide as desired, thus resulting in an almost single circular line contact at one extreme of the range, or in more or less wide spherical sector area contacts between the ring bearing surface 42 and the peripheral spherical surface 16 of the ball 14 at the other extreme of the range and as shown respectively at 86 and 88 at FIG. 3. The portion of the ring bearing surface 42 between the lubrication grooves 44 is machined as a spherical surface of slightly larger radius, as shown at 90, and the portions between the circular line formed by the envelope of the points B and the first lubrication groove 44, shown at 92, increase progressively in radius to a dimension at most that of the radius of the spherical surface 90. In the same manner, the area 94 between the envelope of the points C and the edge of the other groove 44 increases in radius to a dimension at most that of the radius of the spherical surface 90. Similarly also, the surface area comprised between the envelope of the points A and the edge 96 of the bearing ring surface 42 is relieved, as shown at 98, and also relieved, as shown at 102, is the area portion between the envelope of the points D and the other edge 100 of the ring bearing surface 42. In view of the relieved surface portions 98 and 102, the bearing ring edges 96 and 100 are prevented from digging into the spherical surface 16 of the ball 14.

For example, the spherical zone 90, between the lubrication grooves 44, may be formed concentric to the ball 14 with a radius a few microns longer than the radius of the ball spherical surface 16, and the spherical zones 86 and 88 formed with the center of the spherical zone 86 being on one side and the center of the spherical zone 88 being on the other side of the axis of symmetry of the nominal spherical surface 42 of the bearing ring 40, the radii being substantially equal to that of the spherical zone 90. Alternatively, the surfaces of the sperical zones 86, 90 and 88 may be formed from a common center, the radius of the spherical zone surface 90 being slightly longer than the radii of the spherical zones 96 and 98, respectively.

Figure 4:
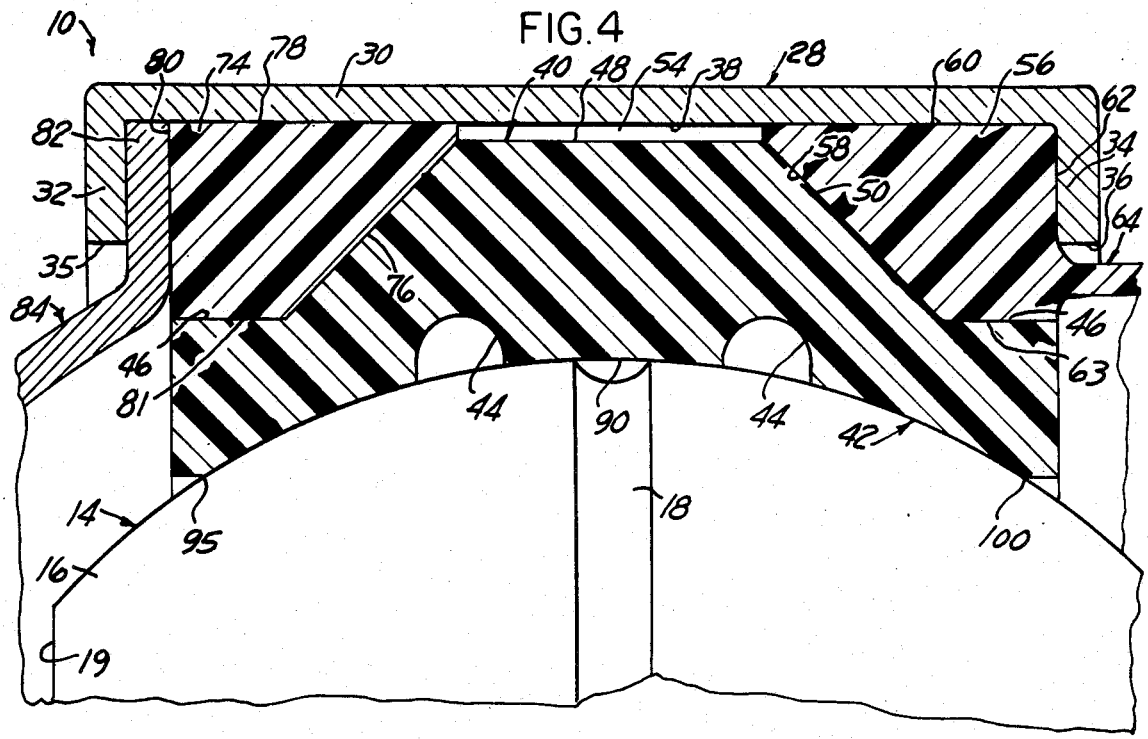
FIG. 4 is a view similar to FIG. 3 but showing the relative position of the diverse elements after wear-in of the bearing surfaces.

In the structure illustrated, the ball 14 is preferably made of a material which is more resistant to wear than the material, plastic for example, of which the bearing ring 40 is made such that, through normal wear during the wear-in period of the bearing unit, the spherical zone surface areas 86 and 88 progressively wear in such a manner that eventually the total area of the ring bearing surface 42 is in engagement, as shown at FIG. 4, with the spherical surface 16 of the ball 14. The split bearing ring 40 is constantly urged by the pre-load force exerted by the elastomeric compression ring 74 and the combination compression and sealing elastomeric ring 56 such as to compensate for wear during a predetermined wear-in period, and for normal wear of the bearing surfaces in service, with a corresponding progressive narrowing of the gaps 52, FIG. 2, between the ring portions 40a and 40b, and with progressive widening of the clearance 54, FIGS. 1 and 4, between the surface of the bore 38 in the shell 28 and the peripheral surface 48 of the bearing ring 40.

It will be readily apparent to those skilled in the art that by providing a pair of narrow spaced apart spherical zone bearing surfaces 86 and 88, FIG. 3, in engagement with the spherical peripheral surface 16 of the ball 14, the ball 14 and its socket defined by the bearing ring 40 are maintained constantly substantially concentric, even when subjected to forces directed along the axis of the stud 12, FIG. 1, which would not be the case of the bearing surface 42 of the bearing ring 40 were conformed to the same dimensions and the same shape as the spherical surface 16 of the ball 14, as is conventional in the art. In conventional structures, the longitudinal forces tend to open up the curvature of the bearing surface 42, with the result that the areas of the ring bearing surface 42 in engagement with the spherical peripheral surface 16 of the ball 14 tend to be limited only to a narrow area between the grooves 44. Through progressive wearing-in and widening of the spherical zone areas 86 and 88, in structures according to the invention, and under the wear take-up action of the elastomeric compression rings 74 and 56, the shapes of the bearing ring convex spherical surface 42 and of the peripheral spherical surface 16 of the ball 14 progressively conform with each other, irrespective of any small imperfection that may have existed when the bearing unit was first installed and placed in service.

The same principles are applicable to bearing units other than spherical bearings, such as, for example, the cylindrical bearing unit 110 of FIGS. 5–8. The cylindrical bearing unit 110 is typical of drag-link inter-member connection or suspension system attachment joints wherein a member, not shown, is attached to an inner member defined by a cylindrical rod 112 which, in some applications, may be tubular, at the portions of the rod 112 projecting on each end of a housing or shell 114 which, in turn, is clamped in or otherwise fastened to another member of the drag-link or suspension assembly, not shown. A split bearing ring or sleeve 116 is disposed in the shell 114, coaxially with the rod 112, and is constantly urged with its substantially cylindrical bearing surface 118 in engagement with the cylindrical peripheral surface 120 of the inner member or rod 112 by a pair of compressed elastomeric rings 122 compressibly fitted between the bore 124 of the shell 110 and a reduced diameter portion 126 formed at each end of the bearing ring or sleeve 116. The split bearing ring or sleeve 116 has a peripheral cylindrical surface 128 fitting within the bore 124 of the shell 114, and is held within the shell 114 by radially formed end flanges 130, such that the compression elastomeric rings 122, in addition of being compressed radially between the shell bore 124 and the reduced diameter end cylindrical surfaces 126, are compressed laterally between the inner surface or the end flanges 130 and the annular step surface 132 formed at the junction between the sleeve cylindrical peripheral surface 128 and the reduced diameter end surfaces 126. As best shown at FIG. 6, the split bearing ring or sleeve 116 is split preferably along its diameter such as to form two half-sleeve portions 116a and 116b separated by spaces or diametrically disposed gaps 134, such that the sleeve bearing surface 118 is urged constantly in engagement with the peripheral surface 120 of the inner member or rod 112 under the pre-load force provided by the compressed elastomeric rings 122.

According to the present invention, the bearing surface 118 of the split bearing ring or sleeve 116 is purposely made non-cylindrical, such as to engage the peripheral surface 120 of the inner member 112 only along relatively narrow bands, symmetrically disposed as shown at 136, an arcuate surface, as seen in profile and as shown at 138 in a somewhat exaggerated manner at FIG. 5, being disposed between the contact surfaces 136. A relief non-contact area is provided beyond each of the contact areas 136, as shown at 140. During wear-in of the bearing unit 114, in the course of which the inner member 112 is constantly oscillated in rotation relative to the split bearing ring or sleeve 116, the contact band areas 136 progressively widen until the bearing surface 118 of the split ring or sleeve 116 engages the full area of the peripheral surface 120 of the inner member 112 from one end to the other of the split bearing ring or sleeve 116, as shown at FIG. 7, such that full load forces can be transmitted from the inner member 112 to the split bearing ring or sleeve 116. During the progressive wearing of the surfaces, under the pre-load radially directed force exerted by the elastomeric compression rings 122, the compression rings progressively expand and the clearance gap 142 between the larger diameter peripheral surface 128 of the split bearing ring or sleeve 116 and the inner bore 124 of the shell 110 is progressively enlarged, with progressive reduction in width of the gaps 134 between the bearing ring or sleeve portions 116a and 116b. In most installations, because the inner member 112 is subjected to little, if any, longitudinal displacement relative to the bearing ring or sleeve 116, it does not matter if the surface wear is evenly distributed between the peripheral surface 120 of the inner member 112 and the bearing surface 118 of the bearing ring or sleeve, as the overall result is eventual exact conformity between the geometry of the peripheral surface 120 of the inner member 112 and the geometry of the bearing surface 118 of the bearing ring or sleeve 116.

Although the invention has been described and illustrated relative to bearing assemblies comprising an inner member of finite shape configuration and an outer member in the form of a split ring having only limited areas of finite complementary shape configuration adapted to wear-in to full areas of complementary shape configuration, it will be apparent to those skilled in the art that the inner member may be formed such as to present limited areas of its bearing surface of finite shape configuration adapted to wear-in to full area shape configuration complementary to that of the bearing surface of the outer member, and that areas of finite shape configurations may be distributed on the bearing surfaces of both the inner and the outer members.

Having thus described the present invention by way of structural examples of spherical and cylindrical bearings made in accordance with the present invention, modifications whereof will be apparent to those skilled in the art.

What is claimed as new is as follows:

1. A method of manufacturing a bearing comprising an inner member having a peripheral surface of regular predetermined contour, a hollow shell, a bearing ring disposed in said shell and having a bearing surface in sliding engagement with a peripheral bearing surface of said inner member, and means between the inner surface of said shell and the peripheral surface of said bearing ring for biasing the bearing surface of said bearing ring towards the peripheral bearing surface of said inner member, said method comprising forming said bearing surfaces such that major areas of the bearing surfaces are non-conforming in shape to a slight degree and the bearing surfaces in sliding engagement have each a minor area substantially less than the total bearing surface area available, inserting said bearing ring into said hollow shell and onto said inner member with said biasing means disposed between the inner surface of said shell and the peripheral surface of said ring to preload and cause engagement of said minor area of said ring with said inner member, and wearing-in said surfaces in sliding engagement for progressively causing an increase in areas of said surfaces in sliding engagement, wherein the bearing surface of said bearing ring and the peripheral bearing surface of said inner member in sliding engagement mutually engage after assembly at portions intermediate the ends of said bearing ring available bearing surface.

2. The method of claim 1 wherein said surfaces are spherical surfaces.

3. The method of claim 1 wherein said surfaces are cylindrical surfaces.

* * * * *